(12) United States Patent
Adamczyk et al.

(10) Patent No.: US 7,941,267 B2
(45) Date of Patent: *May 10, 2011

(54) METHODS, SYSTEMS AND COMPUTER PROGRAM PRODUCTS FOR RIDE MATCHING BASED ON SELECTION CRITERIA AND DRIVER CHARACTERISTIC INFORMATION

(75) Inventors: Maria Adamczyk, Alpharetta, GA (US); Steven Tischer, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/582,233

(22) Filed: Oct. 20, 2009

(65) Prior Publication Data

US 2010/0042549 A1    Feb. 18, 2010

Related U.S. Application Data

(63) Continuation of application No. 11/505,534, filed on Aug. 17, 2006, now Pat. No. 7,627,422, which is a continuation-in-part of application No. 11/372,747, filed on Mar. 10, 2006, now Pat. No. 7,191,057, which is a continuation of application No. 11/157,355, filed on Jun. 21, 2005, now Pat. No. 7,082,364, which is a continuation of application No. 10/602,150, filed on Jun. 24, 2003, now Pat. No. 6,925,381.

(51) Int. Cl.
*G01C 21/00* (2006.01)

(52) U.S. Cl. ......... 701/201; 701/208; 701/117; 340/434

(58) Field of Classification Search .......... 701/200–202, 701/208, 117, 210; 340/434, 988
See application file for complete search history.

(56) References Cited

U.S. PATENT DOCUMENTS 4,445,118 A    4/1984    Taylor et al. .................. 343/357
(Continued)

FOREIGN PATENT DOCUMENTS
WO            9944186            9/1999

OTHER PUBLICATIONS

Cellocate Beacon™ Network, Cell-Loc Inc., V.1.6, Feb. 2002.
(Continued)

*Primary Examiner* — Yonel Beaulieu
(74) *Attorney, Agent, or Firm* — Myers Bigel Sibley & Sajovec

(57) ABSTRACT

Systems, methods and computer program products are provided for matching a passenger with a driver for a trip to a destination. Characteristic information about a plurality of drivers is received and a plurality of selection criteria are received from the passenger. A request for the trip is received from the passenger. One of the drivers is automatically identified as a candidate driver for the trip based on the selection criteria and the characteristic information responsive to the received request. Contact information is provided to the passenger and/or the identified candidate driver to match the passenger with the identified candidate driver. One or more of the drivers may be associated with transportation service providing companies and the request for the trip may be a reservation request for a planned trip at a scheduled time in the future and the reservation request may include a date and/or time defining the scheduled time in the future.

14 Claims, 9 Drawing Sheets

U.S. PATENT DOCUMENTS

| | | | |
|---|---|---|---|
| 5,418,538 A | 5/1995 | Lau | 342/357 |
| 5,663,735 A | 9/1997 | Eshenbach | 342/357 |
| 6,584,401 B2 | 6/2003 | Kirshenbaum et al. | 701/202 |
| 6,925,381 B2 | 8/2005 | Adamczyk | 701/210 |
| 7,082,364 B2 | 7/2006 | Adamczyk | 701/201 |
| 7,191,057 B2 | 3/2007 | Adamczyk | 701/201 |
| 7,627,422 B2 * | 12/2009 | Adamczyk et al. | 701/201 |
| 2001/0056363 A1 | 12/2001 | Gantz et al. | 705/9 |
| 2004/0049424 A1 | 3/2004 | Murray et al. | 705/14 |

OTHER PUBLICATIONS

Moeglin, M. Krasner, K.; An Introduction to Snap Track™ Server-Aided GPS Technology; prior to May 2003.

* cited by examiner

METHODS, SYSTEMS AND COMPUTER PROGRAM PRODUCTS FOR RIDE MATCHING BASED ON SELECTION CRITERIA AND DRIVER CHARACTERISTIC INFORMATION

RELATED APPLICATIONS

This application claims priority to and is a continuation of U.S. patent application Ser. No. 11/505,534, filed Aug. 17, 2006 (now U.S. Pat. No. 7,627,422, issued Dec. 1, 2009), which is a continuation in part of U.S. patent application Ser. No. 11/372,747, filed Mar. 10, 2006 (now U.S. Pat. No. 7,191,057, issued Mar. 13, 2007), which claims priority to and is a continuation of U.S. patent application Ser. No. 11/157,355, filed Jun. 21, 2005 (now U.S. Pat. No. 7,082,364, issued Jul. 25, 2006), which claims priority and is a continuation of U.S. patent application Ser. No. 10/602,150, filed Jun. 24, 2003 (now U.S. Pat. No. 6,925,381, issued Aug. 2, 2005), the disclosures of which are hereby incorporated herein by reference.

BACKGROUND OF THE INVENTION

The present invention relates to the field of data communications in general and more particularly, to ride matching systems.

Wireless communication systems (networks) are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

As the wireless communication industry continues to advance, other technologies are being integrated within these communication systems in order to provide value-added services. Recent governmental mandates, e.g., the response time requirements of the FCC Phase II E-911 service, make it imperative that the position of a mobile handset be determined accurately and in an expedited manner. One technology being considered to facilitate location determination is the global positioning system (GPS). Briefly, as illustrated in FIG. 1, GPS is a space-based triangulation system using satellites 52 and computers 58 to measure positions anywhere on the earth. GPS was first developed by the United States Department of Defense as a navigational system. The advantages of this navigational system over other land-based systems are that it is not limited in its coverage, it provides continuous 24-hour coverage, regardless of weather conditions, and is highly accurate. While the GPS technology that provides the greatest level of accuracy has been retained by the government for military use, a less accurate service has been made available for civilian use. In operation, a constellation of 24 satellites 52 orbiting the earth continually emit a GPS radio signal 54. A GPS receiver 56, e.g., a hand-held radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 56 through a process of triangulation.

A variety of mobile terminal (MT) location techniques have been proposed. These location techniques include those based solely on the wireless network signals, Global Positioning System (GPS) based approaches and assisted GPS approaches combining communication signals and GPS signals.

Taylor et al., U.S. Pat. No. 4,445,118, discusses the concept of aiding or assisting GPS receivers. The assistance information allows the position computation function (PCF) to be done in the user receiver. Lau, U.S. Pat. No. 5,418,538, describes a system and method for aiding a remote GPS/GLONASS receiver by broadcasting "differential" information from a like receiver in a "reference station." Eshenbach, U.S. Pat. No. 5,663,735, describes a method whereby a GPS receiver derives an accurate absolute time reference from a radio signal. The GPS receiver performs the position calculation, and therefore must have the absolute time as well as the ephemeris and clock corrections for the GPS satellites. Another assisted-GPS standard for GSM-based networks is described in specification numbers 3GPP TS 04.31 and 3GPP TS 03.71. This standard is based on placing reference GPS receivers at various nodes in the network, capturing the ephemeris information from these receivers, then providing this information along with a list of visible satellites to all handset-based GPS receivers via messages on GSM downlink bearers. The benefit of this approach is that it allows the handset-based GPS receiver to be fully functional, i.e., it contains the PCF and also can operate in continuous navigation mode.

Another approach to a reduced complexity GPS location service to satisfy governmental mandates for FCC Phase II E-911 service provides only a simplified, GPS receiver in the MT, rather than a full function autonomous GPS receiver. An assisted location service associated with the communication network then is used to calculate the position of the MT. Such an approach is specified in the TIA/EIA/IS-801-1 specification (IS-801), which is implemented in the GPSOne protocol assisted location service available from SnapTrack Inc, a Qualcomm Company, as described at the website http://www.snaptrack.com. A GPSOne compatible receiver (i.e. located in the mobile terminal) generally performs all GPS satellite acquisition functions and then sends measurements to a centralized location server of a CDMA network serving the mobile terminal. By generating only intermediate navigation data at the GPSOne compatible receiver, some of the burden of performing positioning calculations may be shifter to the location server.

SUMMARY OF THE INVENTION

Embodiments of the present invention include computer-implemented methods for matching a passenger with a driver for a trip to a destination. Characteristic information about a plurality of drivers is received and a plurality of selection criteria are received from the passenger. A request for the trip is received from the passenger. One of the drivers is automatically identified as a candidate driver for the trip based on the selection criteria and the characteristic information responsive to the received request. Contact information is provided to the passenger and/or the identified candidate driver to match the passenger with the identified candidate driver. Ones of the drivers may be associated with transportation service providing companies and the request for the trip may be a reservation request for a planned trip at a scheduled time in the future and the reservation request may include a date and/or time defining the scheduled time in the future.

In other embodiments, the selection criteria include at least one static criteria not associated with a time of the trip and/or at least one dynamic criteria associated with the time of the trip. The static criteria may include a language spoken by a driver, passenger size of a vehicle driven by a driver, type of vehicle driven by a driver, quality rating of a driver, a driving record of a driver, a criminal record of a driver and/or a form of payment accepted by a driver. The dynamic criteria may include, a proximity of a current location of a driver to a trip start location associated with the passenger, traffic conditions associated with a route from a current location of a driver and a trip start location associated with the passenger, acceptable limits associated with current data from sensors associated with a vehicle of a driver and/or an expected wait time before a driver would be expected to arrive at a trip start location associated with the passenger.

In further embodiments, automatically identifying one of the drivers as a candidate driver for the trip includes identifying a plurality of the plurality of drivers as negotiating parties for the trip. Offers are obtained from the negotiating parties for the trip and one of the negotiating parties is selected as the candidate driver based on the offers. Obtaining offers and selecting one of the negotiating parties may include establishing a bartering communication connection between the negotiating parties. Selecting one of the negotiating parties may include providing the obtained offers to the passenger and receiving a designation of one of the negotiating parties as the candidate driver from the passenger responsive to providing the obtained offers to the passenger. Selecting one of the negotiating parties may include selecting the one of the negotiating parties based on a comparison of the obtained offers to the selection criteria.

In other embodiments, receiving a request for a trip includes receiving requests for trips from a plurality of passengers to provide a plurality of currently pending requests for trips. A plurality of the currently pending requests for trips are associated as a candidate shared ride trip having a plurality of associated passengers. It is determined if the passengers associated with the candidate shared ride trip consent to conversion of their respective requests for trips to a request for a shared ride trip that mergers their respective requests for trips to a single request. One of the drivers is automatically identified as a candidate driver for the shared ride trip only when a plurality of the passengers associated with the candidate shared ride trip consent. Associating a plurality of the currently pending requests for trips as a candidate shared ride trip having a plurality of associated passengers may includes determining start locations associated with the currently pending requests and associating ones of the currently pending requests having start locations that satisfy a proximity criterion. Associating a plurality of the currently pending requests for trips as a candidate shared ride trip having a plurality of associated passengers may further include determining destinations associated with the currently pending requests and associating one of the currently pending requests may include associating ones of the currently pending requests having destinations that satisfy a routing criterion and having start locations that satisfy the proximity criterion.

In further embodiments, the method further includes notifying the passenger when the identified candidate driver arrives at a start location associated with the trip. Providing the contact information may include providing at least one of the passenger and the identified candidate driver identification information for use in visual identification of the other of the passenger and the identified candidate driver.

In yet other embodiments, feedback is received from the passenger regarding the identified driver. The received feedback is incorporated in the characteristic information about the plurality of drivers. An incentive reward may be provided to the passenger responsive to receiving the feedback from the passenger.

In other embodiments, systems for matching a passenger with a driver for a trip to a destination include characteristic information about a plurality of drivers, a ride matching server and a communication interface. The ride matching server is configured to identify one of the plurality of drivers as a candidate driver for the trip based on selection criteria associated with the passenger and the characteristic information responsive to a received request for a trip The communication interface is configured to receive a request for a driver for a trip from the passenger and to provide contact information to the passenger and/or the identified candidate driver to match the passenger with the identified candidate driver.

In further embodiments, the ride matching server further includes a bartering module configured to identifying a plurality of the plurality of drivers as negotiating parties for the trip, obtain offers from the negotiating parties for the trip and select one of the negotiating parties as the candidate driver based on the offers. The ride matching server may further include a ride sharing module configured to associate a plurality of currently pending requests for trips as a candidate shared ride trip having a plurality of associated passengers, determine if the passengers associated with the candidate shared ride trip consent to conversion of their respective requests for trips to request for a shared ride trip that mergers their respective requests for trips to a single request.

While described above primarily with reference to systems and methods and computer program products for matching a passenger with a driver for a trip to a destination are also provided.

DETAILED DESCRIPTION

Figure 1:
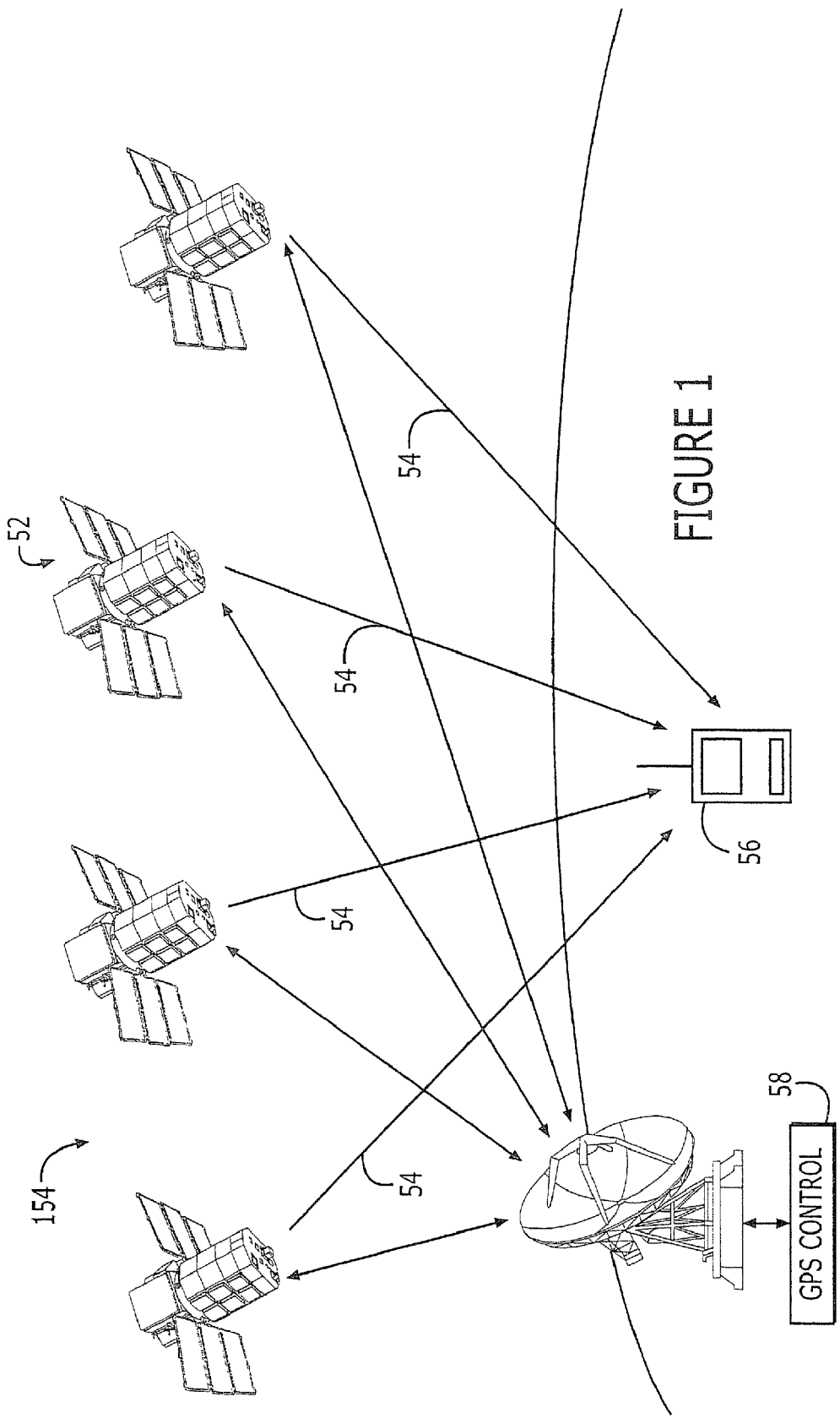
FIG. 1 is schematic block diagram illustrating a GPS system.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer-usable program code means embodied in the medium. Any suitable computer readable medium may be used including hard disks, CD-ROMs, optical storage devices, a transmission media such as those supporting the Internet or an intranet, or magnetic storage devices.

Computer program code for carrying out operations of the present invention may be written in an object oriented programming language, such as Java® or C++. However, the computer program code for carrying out operations of the present invention may also be written in conventional procedural programming languages, such as the "C" programming language or assembly language. The program code may execute entirely on the user's computer, partly on the user's computer, as a stand alone software package, partly on the user's computer and partly on a remote computer, or entirely on the remote computer. In the latter scenario, the remote computer may be connected to the user's computer through a local area network (LAN) or a wide area network (WAN).

The present invention is described below with reference to flowchart illustrations and/or block diagrams of methods, apparatus (systems) and computer program products according to some embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

Figure 2:
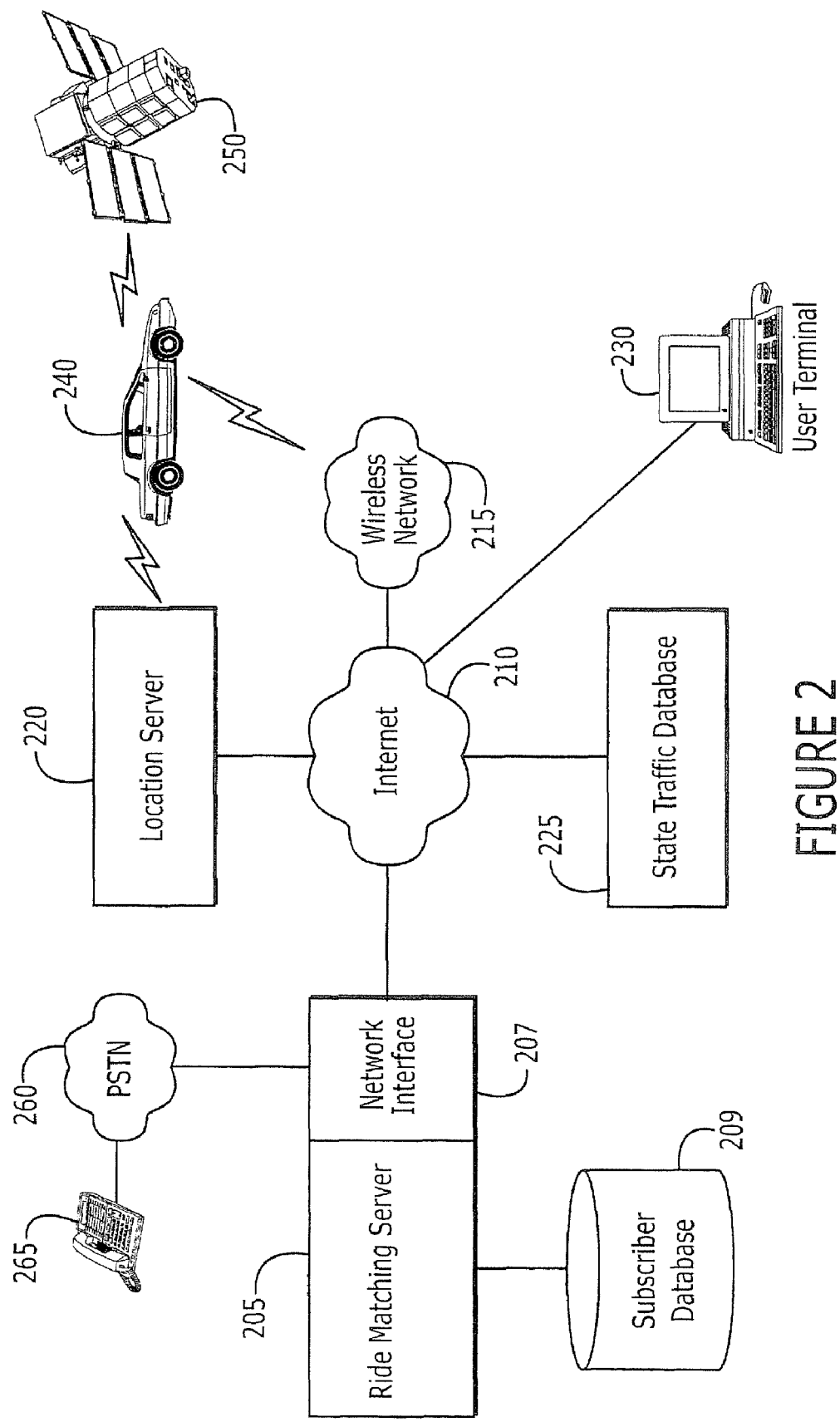
FIG. 2 is schematic block diagram illustrating a ride matching system according to some embodiments of the present invention.

Embodiments of the present invention will now be described with respect to the figures. Embodiments of the present invention provide methods, systems and/or computer program products for matching a passenger with a driver for a trip to a destination. Referring first to FIG. 2, a hardware and software environment including embodiments of the present invention will be described. As shown in FIG. 1, a ride matching server 205 is coupled through a network interface 207 to a network 210, such as an internet network. The ride matching server 205 is further operatively coupled to a subscriber data base 209. The ride matching server 205 is configured to identify a candidate driver for a trip requested by a passenger based on the current location of the candidate driver. The subscriber database 209 contains information related to subscribed users, who may be identified as passengers, drivers or both. The subscriber database 209 may contain additional information in various embodiments of the present invention, such as availability information for the designated drivers stating times and dates on which they are available for providing driver services responsive to passenger requests for a ride. Destinations may also be associated with passengers and/or drivers as well as start points for particular passengers and/or drivers. Thus, a ride matching server 205 may be configured to identify a candidate driver based on a variety of information including, but not limited to, the start location of a passenger, the current location of the driver, an associated destination of the passenger and/or driver and/or availability information for the driver.

As will be further described herein, the drivers may be individuals and/or companies, such as taxi companies, limousine services and the like. The ride matching server 205 may also be configured to identify a driver on selection criteria other than location of the driver and may further negotiate provision of a ride service among multiple potential drivers and/or to provide ride sharing for multiple passengers independently requesting drivers. The ride matching server 205 may also solicit feedback from passengers and provide incentives for such feedback and store the feedback on the subscriber database 209 as quality ratings for drivers or the like.

The network interface 207, as shown in FIG. 2, couples to the internet 210 and the public switch telephone network (PSTN) 260. The network interface 207 further couples through the internet 210 to the wireless network 215 and other devices accessible over the internet 210. However, it is to be understood that the network interface 207 may, instead, directly couple to the wireless network 215 or to other of the server and terminal devices shown as accessed over the internet 210. Similarly, network interface 207 may connect to the PSTN 260 over the internet 210. As such, the network interface 207 provides a location information interface configured to receive current location information associated with a candidate driver from a satellite positioning system. In various embodiments of the present invention, such current location information is obtained from a location server 220. The location server 220 may obtain the satellite positioning based location information either directly from user location devices, such as car phone/mobile terminal 240 (hereinafter referred to as a mobile terminal) or through the wireless network 215 and the internet 210. The location information is acquired by the mobile terminal 240 based on measurements of signals from positioning system satellites, such as the GPS satellite 250.

The network interface 207 is further configured to receive a request for a driver for a trip from a passenger and to provide the passenger an identification of a candidate driver. The request for a driver may come from a variety of different sources, such as from the telephone 265, over the PSTN 260 or from the user terminal 230 over the internet 210. Similarly, a passenger may be provided an identification of a candidate driver by the network interface 207 over the PTSN 260, the internet 210 and/or the wireless network 215.

Also shown in FIG. 2 is a state traffic database 225 coupled to the internet 210. In various embodiments of the present invention, the network interface 207 may be operatively coupled to the state traffic database 225 so as to obtain current traffic information from the state traffic database 225.

As will be understood by those having skill in the art, a network 210 may include a plurality of separate linked physical communication networks, which, using a protocol, such as the Internet protocol (IP), may appear to be a single seamless communications network to user application programs. In addition, the network interface 207 may be a plurality of different interfaces coupled to different network types including wired and wireless networks. The location server 220 may be a variety of different location server types, such as an assisted location server associated with the wireless network 215 in connection, for example, with E911 service or other type of location server associated with the wireless network 215 that communicates with mobile terminals 240 directly or through the wireless network 215. Alternatively, the location server 220 may be integrated with the ride matching server 205 and maintained primarily to support the ride matching server 205 rather than being an integral part of an unrelated system, such as E911 location service. The user terminal 230 may be also be directly coupled to the ride matching server 205 rather than connected thereto over the internet 210. Similarly, the subscriber database 209 may be accessed by the ride matching server 205 over the internet 210 rather than being directly connected to the ride matching server 205.

Figure 3:
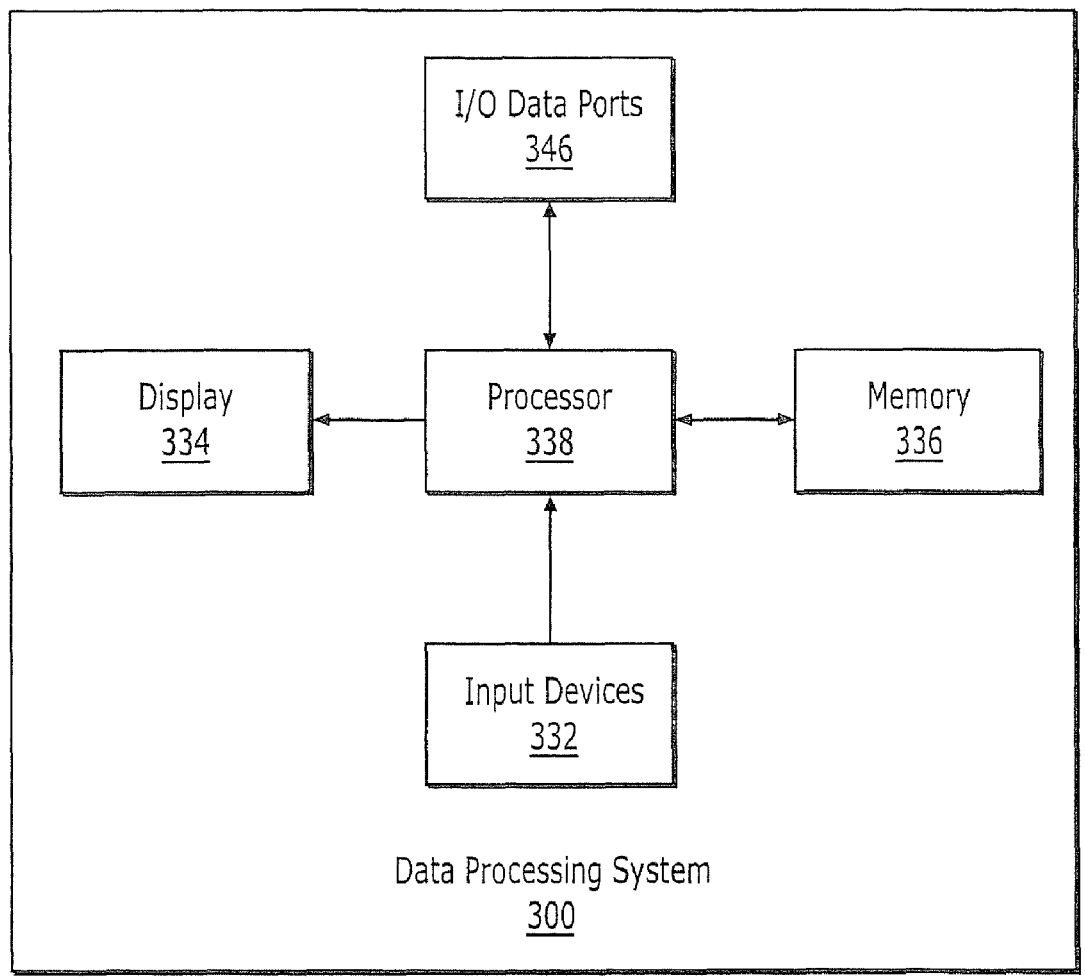
FIG. 3 is a block diagram of a data processing system implementing a ride matching server according to some embodiments of the present invention.

FIG. 3 illustrates an exemplary embodiment of a data processing system 300 suitable for use in accordance with embodiments of the present invention. The data processing system 300 typically includes input device(s) 332 such as a keyboard or keypad, a display 334, and a memory 336 that communicate with a processor 338. The data processing system 330 may further include an I/O data port(s) 346 that also communicate with the processor 338. The I/O data ports 346 can be used to transfer information between the data processing system 330 and another computer system or a network, such as the network 210 of FIG. 2. These components may be conventional components, such as those used in many conventional data processing systems, which may be configured to operate as described herein.

Figure 4:
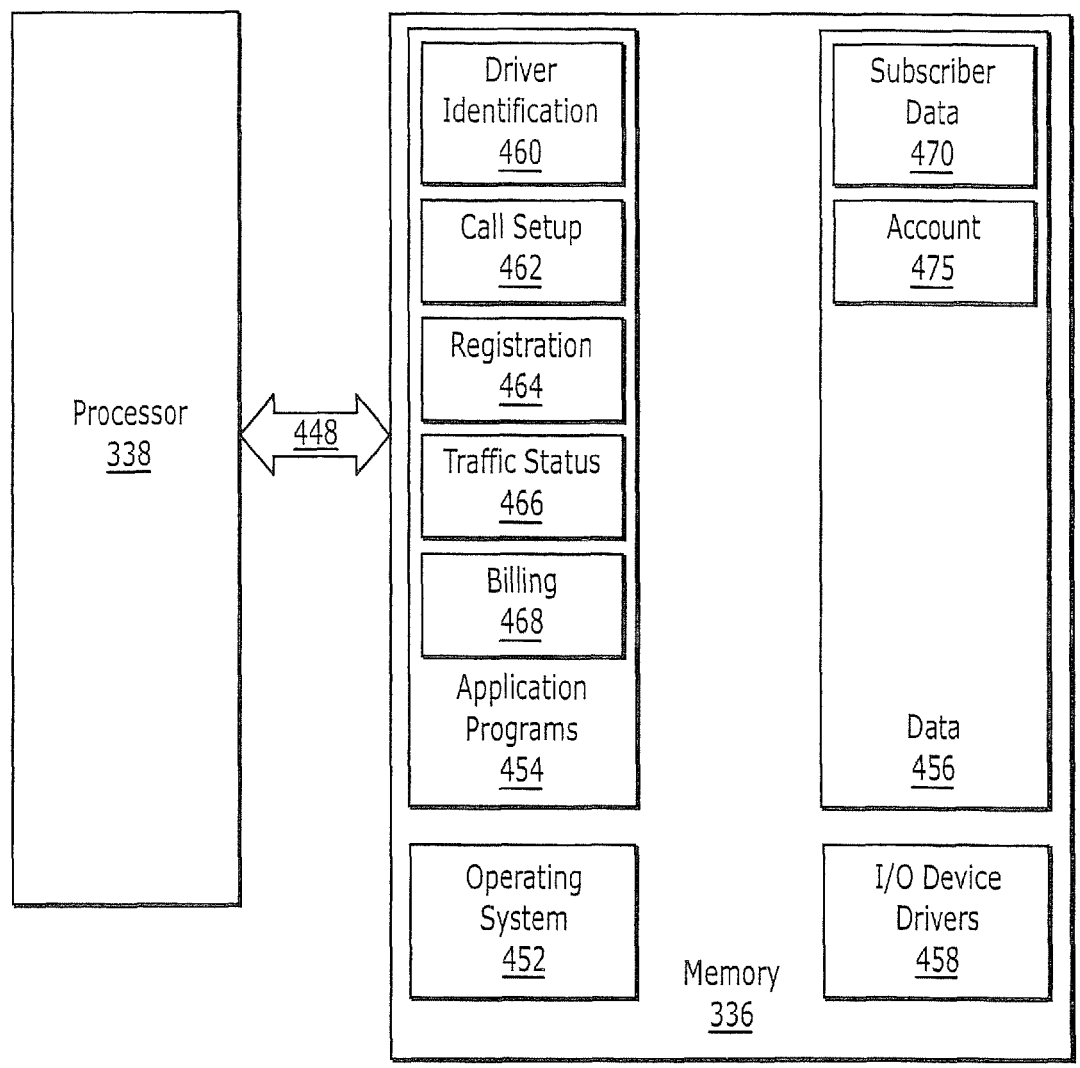
FIG. 4 is a more detailed block diagram of a data processing system implementing a ride matching server according to some embodiments of the present invention.

FIG. 4 is a block diagram of a data processing (computer) system that further illustrates systems, methods, and computer program products in accordance with embodiments of the present invention. The processor 338 communicates with the memory 336 via an address/data bus 448. The processor 338 can be any commercially available or custom microprocessor. The memory 336 is representative of the overall hierarchy of memory devices containing the software and data used to implement the functionality of the data processing system 300. The memory 336 can include, but is not limited to, the following types of devices: cache, ROM, PROM, EPROM, EEPROM, flash memory, SRAM, and DRAM.

As shown in FIG. 4, the memory 336 may include several categories of software and data used in the data processing system 300: the operating system 452; the application programs 454; the input/output (I/O) device drivers 458; and the data 456. As will be appreciated by those of skill in the art, the operating system 452 may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows XP or Windows 2000 from Microsoft Corporation, Redmond, Wash., Unix or Linux. The I/O device drivers 458 typically include software routines accessed through the operating system 452 by the application programs 454 to communicate with devices such as the I/O data port(s) 346 and certain memory 336 components. The application programs 454 are illustrative of the programs that implement the various features of the data processing system 300 and preferably include at least one application that supports operations according to embodiments of the present invention. Finally, the data 456 represents the static and dynamic data used by the application programs 454, the operating system 452, the I/O device drivers 458, and other software programs that may reside in the memory 336.

As is further seen in FIG. 4, the application programs 454 may include a driver identification module 460, a call setup module 462, a registration module 464, a traffic status module 466 and/or a billing module 468. The driver identification module 460 is configured to identify one or more drivers as candidate driver(s) based on, for example, a determined start location of a passenger and the current locations of the driver(s). The driver identification module 460 may further be configured to determine a start location of the passenger and the current locations of the plurality drivers. The call set up module 462, in various embodiments of the present invention, is configured to provide a passenger an identification of a candidate driver or drivers, for example, by establishing a communication connection between the passenger and the candidate driver.

The registration module 464 is configured to receive a request from a passenger for a driver for a trip. A request may specify the destination for the trip. Registration module 464 may be configured to receive such a request specific to a particular trip and/or as an initial registration procedure for subscribers as drivers and/or passengers in the subscriber database 209. Such initial registration information may include a selection of registration as a passenger and/or driver, a normal start point, a default destination point, an availability time for a driver and/or a normal associated destination for the driver.

In particular embodiments of the present invention, the traffic status module 466 is configured to obtain current traffic information from a traffic database that may be used by driver identification module 460 in identifying an appropriate candidate driver for a trip. Various embodiments of the present invention further include a billing module 468 that is configured transfer payment amounts from an account of a passenger to an account of the candidate driver for an agreed trip.

The data portion 456 of memory 336, as shown in the embodiments of FIG. 4, may include various types of data, such as the subscriber data 470 and the account data 475. The subscriber data 470, as discussed above, may include information received from the registration module 464. Similarly, the account data 475 may include separate accounts associated with each of the subscribers and may be used by the billing module 468 in arranging payment for different trips. Alternatively, where accounts for both the payee and the payor of a particular transaction are not available, the billing module 468 and the accounts data 475 may be used to generate the necessary billing information and credit any subsequent payments.

While the present invention is illustrated, for example, with reference to the driver identification module 460 being an application program in FIG. 4, as will be appreciated by those of skill in the art, other configurations may also be utilized while still benefiting from the teachings of the present invention. For example, the driver identification module 460 may also be incorporated into the operating system 452 or other such logical division of the data processing system 300. Thus, the present invention should not be construed as limited to the configuration of FIG. 4 but is intended to encompass any configuration capable of carrying out the operations described herein.

Furthermore, while each of the driver identification module 460, the call setup module 462, the registration module 464 and the traffic status module 460 are illustrated in a single data processing system, as will be appreciated by those of skill in the art, such functionality may be distributed across one or more data processing systems. For example, the functionality of the driver identification module 460 may be provided on one or more data processing (computer) systems that are separate from the data processing system that provides the functionality of the call setup module 462. Thus, the present invention should not be construed as limited to the configuration illustrated in FIGS. 3-4, and may be provided by other arrangements and/or division of function between data processing systems.

Figure 5:
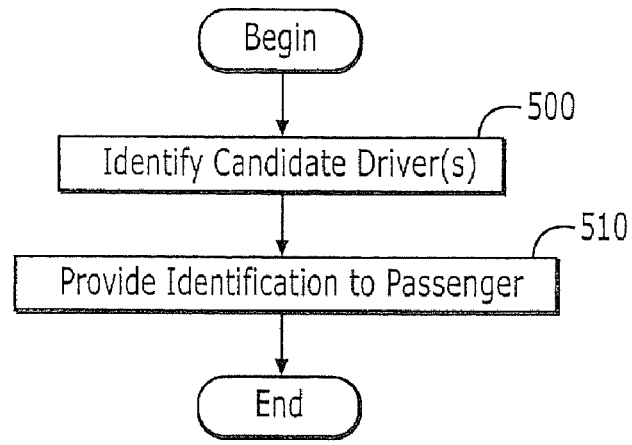
FIG. 5 is a flow chart illustrating operations for matching a passenger with a driver for a trip to a destination according to some embodiments of the present invention.

Referring now to the flowchart diagram of FIG. 5, operations for matching a passenger to a driver for a trip to a destination begin at Block 500 by identifying a candidate driver for the trip based on the current location of the candidate driver, responsive to a request from the passenger. For example, referring to FIG. 2, the request from the passenger may be received over the PSTN 260 from the telephone 265 or over the internet 210 from the user terminal 230. The request may be received at the same time as the driver is needed or may be included in an initial registration of the passenger as a subscriber, for example, by specifying the desire to have a driver to a particular location at a certain time on a particular day each week as part of the initial registration.

After identification of a candidate driver, the identification of the candidate driver is provided to the passenger (Block 510). The passenger may be provided the necessary identification, for example, by establishing a voice connection and/or setting up a text messaging connection between the passenger and the candidate driver so they may negotiate a payment or other agreement for the trip.

Figure 6:
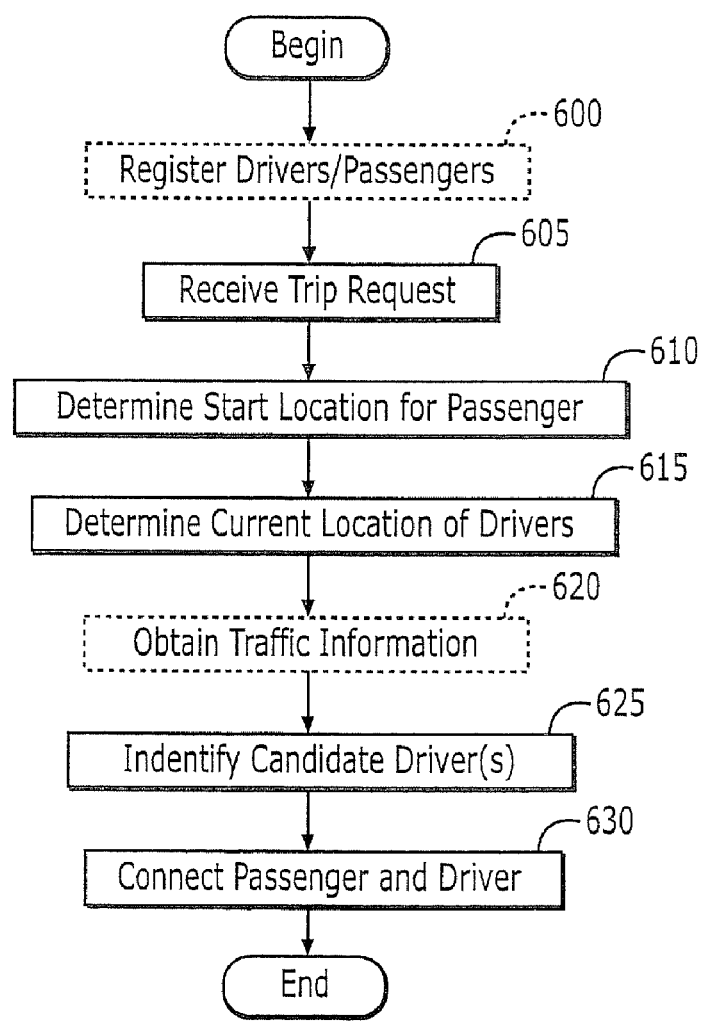
FIG. 6 is a flow chart illustrating operations for matching a passenger with a driver for a trip to a destination according to other embodiments of the present invention.

Further embodiments of the present invention are illustrated in the flow chart diagram of FIG. 6. As shown in FIG. 6, for some such embodiments, operations begin at Block 600 by registration of a variety of subscribers as drivers and/or passengers in the ride matching (carpooling) system. Where the specific trip information is not fully provided by the initial registration operations at Block 600, a matching service registration request is received from a passenger that specifies, for example, a start location and/or destination for the trip if such information is not otherwise available from the initial registration at Block 600 (Block 605). The matching service registration request may also specify a desired time for the trip if it is not a request for immediate identification of a candidate driver.

A start location is determined for the passenger (Block 610). As discussed above, the start location may be provided in the request received at Block 605 or may be retrieved from initial registration information provided at Block 600. Alternatively, the start location may be determined automatically and assumed to correspond with the source of the request. For example, with reference to FIG. 2 where a request is received from the telephone 265, caller identification and correlation of a phone number with an address may be used by the ride matching server 205 to determine the physical location of the telephone 265 and identify that location as the presumptive start point for the trip. Similarly, the request may be received from a mobile terminal 240 that is location enabled and the ride matching server 205 may query the location server 220 to obtain a current location for the mobile terminal 240. The current location for the requesting passenger's mobile terminal may then be presumed to be the start location for the trip request if no alternative start location is specified in the request.

The current location of one or more drivers available for consideration as a candidate driver is determined (Block 615). For example, a last known location of the driver(s) may be obtained from a location service, such as the location server 220 of FIG. 2. The location service may determine the last known location for the drivers based on information obtained by the mobile terminals 240 from the Global Positioning System Satellite 250. The GPS information may be transmitted to the location server 220 over the wireless network 215 and/or the internet 210 or received directly from the driver's mobile terminal 240. In particular embodiments of the present invention, operations at Block 615 include transmitting a request for the last known location to a location server 220 associated with the location service over the communication network, such as the internet 210, and receiving the last known location from the location server 220 over the communication network 210.

In some embodiments of the present invention, operations for matching a passenger with a driver at Block 620 include obtaining current traffic information, for example, from a state traffic database 225 (FIG. 2). Such information may be used in identifying candidate drivers at Block 625. At Block 625, one or more candidate drivers are identified based on respective start location, current location, destination and/or availability data obtained at one or more of Blocks 600, 605, 610, 615 and 620. For example, a driver having a current location and associated destination corresponding to the start location and destination of the passenger and having availability data indicating current availability as a driver may be identified as a candidate driver at Block 625.

More than one candidate driver may be identified at Block 625 and a best selection may be identified first to the passenger for consideration or all of the identified candidates may be provided for consideration to allow the passenger to make a determination as to which candidate driver to contact first to arrange the trip.

After a candidate driver is identified, a communication connection is established between the passenger and the candidate driver (Block 630). A connection may be provided that includes identification of the individual or may be initially established in a manner that protects privacy of the respective passenger and driver with subsequent personal information being provided only after an agreement is reached for the trip. The connection may be a voice connection, email and/or text messaging or other electronic communication media, which may allow the use of the ride matching server 205 to control privacy concerns of the individuals involved.

Figure 7:
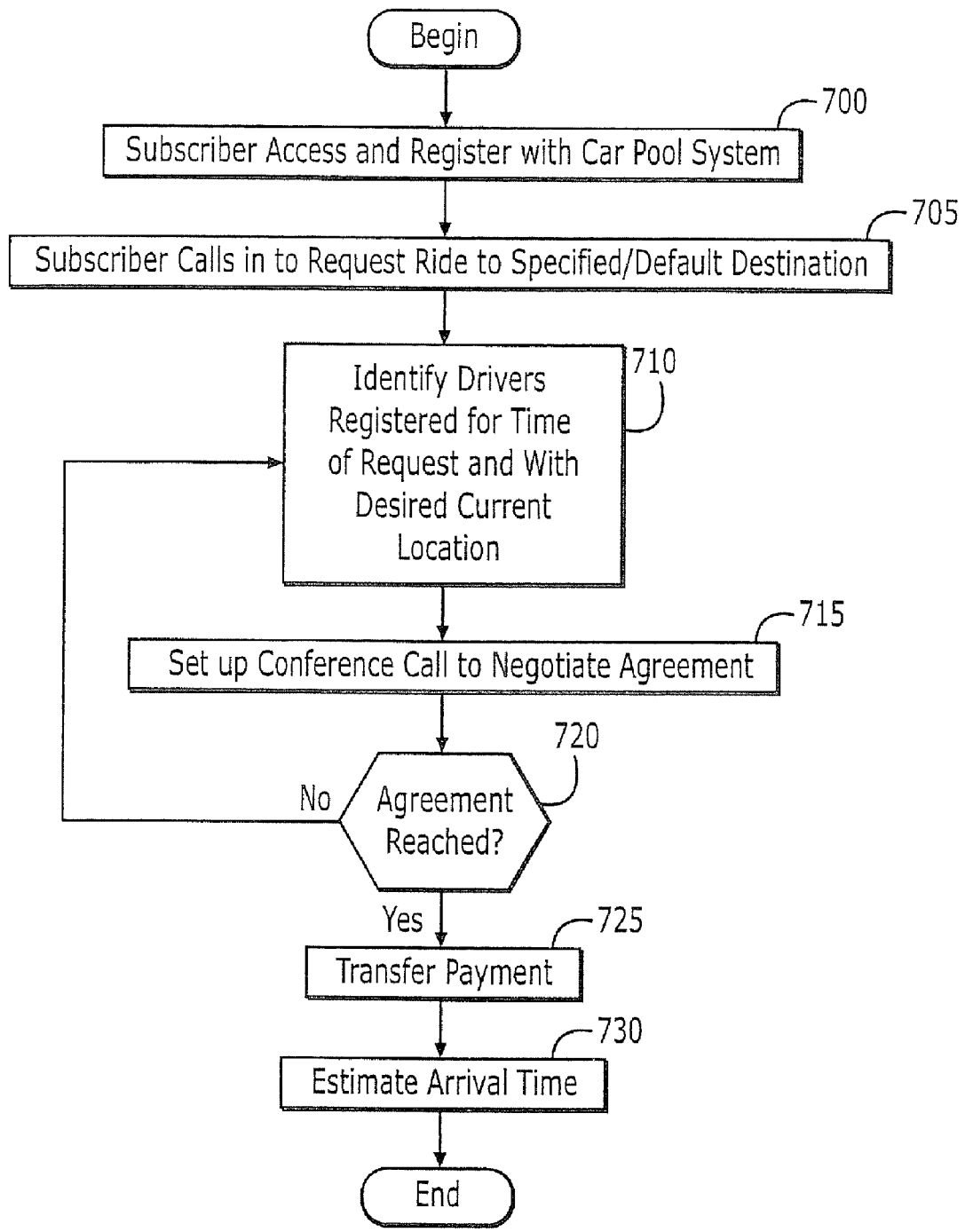
FIG. 7 is a flow chart illustrating operations for matching a passenger with a driver for a trip to a destination according to further embodiments of the present invention.

Further embodiments of the present invention are illustrated in the flow chart diagram of FIG. 7. As shown in FIG. 7, operations begin at Block 700 by having a subscriber access a ride matching service using the ride matching server 205 from a telephone or internet interface to register with the service. Such an initial registration may include providing information such as a home location, a work location, preferred routes for different trips, a wireless phone number, a wireline phone number and/or billing information. The subscriber can, at this time, register as a driver, a passenger, or both. Such registration information may be set up so that it can be updated and/or changed by a subscriber when their information or interest in the ride matching service changes. For a particular trip, the subscriber, in various embodiments of the present invention, calls into the ride matching service to request a ride and specifies a desired destination (or a default destination), such as a work location (Block 705). The request at Block 705 may specify a particular time in the future or may request an immediate identification of a candidate driver.

The ride matching service may then check for available and suitable drivers based on matching criteria, such as start and destination locations and preferred routing given the current location information for the candidate drivers (Block 710). Thus, matches for identifying a driver as a suitable candidate driver for a particular trip request may be found, for example, by correlating registered drivers for the day (i.e. subscribers who have specified availability as drivers for the day) with such drivers current locations and/or driving destinations. The location information used for identifying drivers at Block 710 may be retrieved from a location system, which may in turn use automated car phone and/or wireless terminal based tracking or location information.

If a match between a passenger and a candidate driver is found, the ride matching service establishes a connection, such as a conference call between the candidate driver and the requesting passenger (Block 715). If no agreement related to the trip is reached (Block 720), operations may return to Block 710 to identify additional drivers, either based on the same criteria or modified criteria intended to expand the pool of candidate drivers. If an agreement is reached between the candidate driver and the passenger (Block 720), the ride matching service may transfer payment from an account of the passenger to an account associated with the selected candidate driver (Block 725). In particular embodiments of the present invention, the ride matching service may further provide additional information to the passenger and/or driver, such as calculating the distance for the trip and estimating the arrival time at the destination (Block 730). The arrival time estimation may further consider accident and/or traffic congestion related information for the likely route of the trip based on data obtained from the state traffic database 225 of FIG. 2.

As described above, it will be understood that ride matching systems according to various embodiments of the present invention may increase the usability of carpooling arrangements by making such systems more convenient and efficient through automated identification of candidate drivers based on current location information. Such automated matching of candidate drivers may encourage use of the system by providing for matching of trips between drivers and passengers in a timely fashion. The service may be beneficially implemented in light of the increased usage of wireless devices that include GPS positioning receivers. Security concerns in various embodiments may be addressed by providing a subscriber access to the service with controlled access and verification of personal information stored in a secure database. In addition, such information may be repeatedly utilized so that, when a subscriber calls into the ride matching service, various of the personal information items would already be available for use in determining current availability of suitable drivers heading into the same area as the desired destination for the requesting passenger subscriber.

By automatically initiating a connection between the subscribing passenger and the candidate driver, such as by a telephone conference call, the automated system may further facilitate and reduce the burden of establishing a carpool connection between passengers and drivers. Furthermore, in various embodiments of the present invention, automatic billing arrangements are provided that may be based on actual cash transfers between subscribers or structured in a manner that allocates a fixed value amount to each registered subscriber, which they may then maintain by acting both as a driver and passenger. Thus, the automatic registration of cars (subscribers) and current locations linked with locations of requesting passengers, further facilitated by automated connection of passengers and candidate drivers to arrange details of a trip and, in some embodiments, even automated processing of the payment for the trip between accounts of a passenger and driver, may facilitate more effective utilization of such a ride matching service over current attempts at establishing more carpooling. Accordingly, beneficial improvements in traffic volumes and/or environmental impacts from heavy automotive traffic may be provided particularly in highly dense urban areas.

Figure 8:
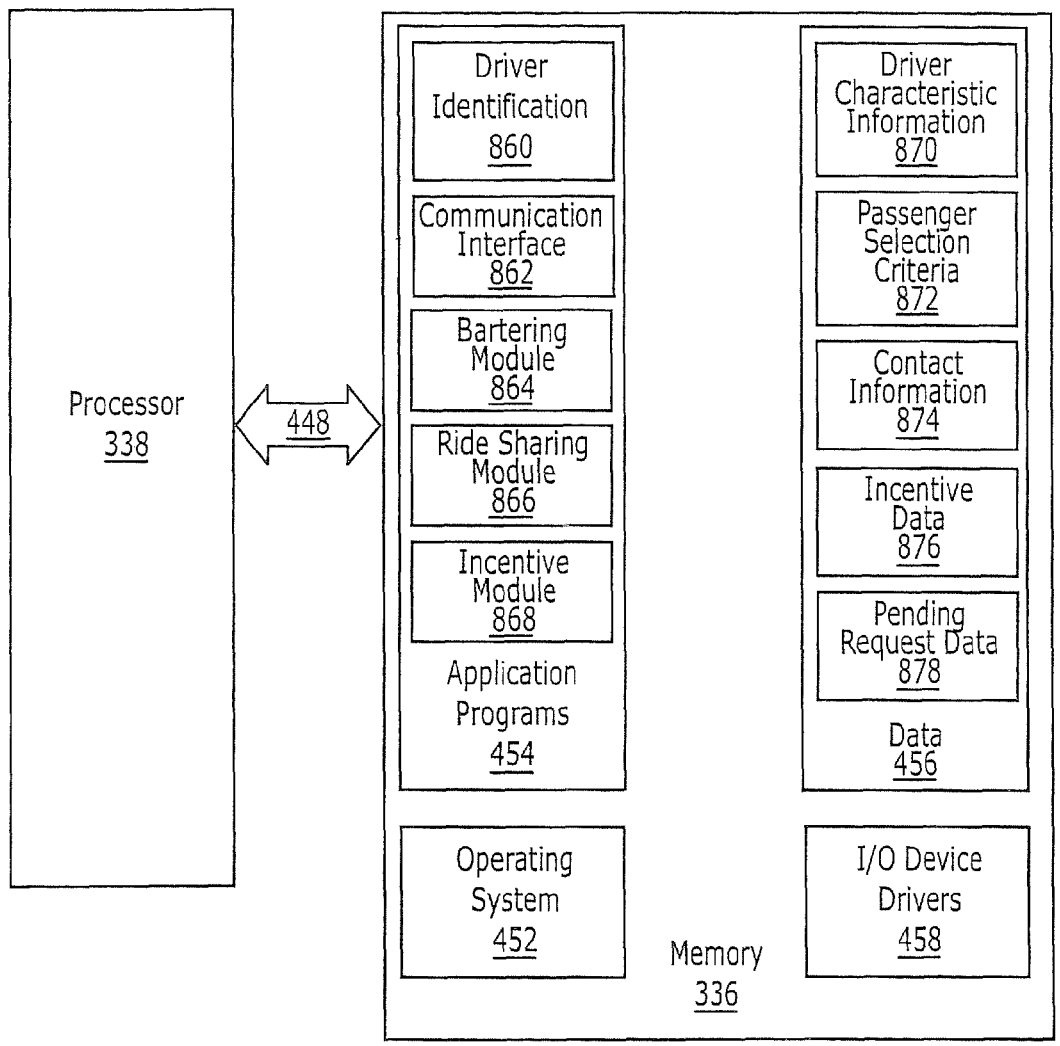
FIG. 8 is a block diagram of a data processing system implementing a ride matching server according to other embodiments of the present invention.

Further embodiments of the present invention will now be described with reference to FIG. 8. FIG. 8 is a block diagram of a data processing (computer) system suitable for use as a ride matching server 205 and subscriber database 209 in some embodiments of the present invention. Like numbered elements shown in FIG. 8 correspond to those described above with reference to FIG. 4 and will not be further described herein.

As seen in the embodiments of FIG. 8, the application programs 454 may include a driver identification module 860, a communication interface module 862, a bartering module 864, a ride sharing module 866 and/or an incentive module 868. The driver identification module 860 is configured to identify one of a plurality of drivers as a candidate driver for a trip requested by a passenger based on selection criteria associated with a passenger and characteristic information about the drivers. For example, as described above with reference to FIG. 4, a candidate driver may be identified based on a determined start location of a passenger and current locations of the drivers. As such, the characteristic information may be a current location of the drivers obtained from a location service or the like as described above, and the selection criteria may be a maximum limit for a distance and/or time between those current locations and the start point of a trip that is acceptable to a passenger. The driver identification module 860 may make the identification of the candidate driver responsive to a received request from a passenger.

The communication interface module 862 may use the I/O device drivers 458 or other aspects of a communication interface, such as the network interface 207 (FIG. 2) to communicate with drivers and/or passengers over PSTN 260, the Internet 210, a wireless network 215 and/or other communication infrastructure. For example, in some embodiments, the communication interface module 862 is configured and operatively coupled to allow communication over ad hoc local networks and intermediate range networks as well as wide area networks. Communication interface module 862 may receive requests for a driver for a trip from a passenger and/or provide contact information to the passenger and/or the identified candidate driver to match the passenger with an identified candidate driver.

As further shown in the embodiments of FIG. 8, the application programs 454 may include the bartering module 864. The bartering module 864, in some embodiments, is configured to identify a plurality of drivers as negotiating parties for a trip and to obtain offers from the negotiating parties for the trip and to select one of the negotiating parties as a candidate driver based on the offers. For example, a selected group of negotiating drivers may correspond to multiple competing taxi companies and bartering or bidding to provide service for a request may be based upon cost and/or other desired features associated with a provided service, such as type of car or other characteristic information associated with the service offer from the taxi companies. Such bartering negotiation between the multiple taxi companies may be structured so as to occur real time with an exchange of competing bids. The negotiations may be between the competing taxi companies and/or the passenger.

The ride sharing module 866 illustrated in the embodiments of FIG. 8 may be configured to associate a plurality of currently pending requests for trips as a candidate shared ride trip having a plurality of associated passengers. The ride sharing module 866 may further be configured to determine if the passengers associated with the candidate shared ride trip consent to conversion of their respective requests for trips to a request for a shared ride trip, where the shared ride trip merges the respective requests for trips to a single request.

The ride sharing module 866 and bartering module 864 may work together. For example, the ride sharing module 866 may receive a plurality of requests for a driver for trips from different prospective passengers attending a convention at a common convention center, all of whom are leaving the convention center to return to a known destination airport. The ride sharing module 866 may associate all the requesting passengers at the convention center and notify the requesting passengers that they are all headed to a common airport destination and provide them the option of sharing a cab for the trip to the airport. Furthermore, the ride sharing module 866 may be used in conjunction with the bartering module 864 by allowing bartering negotiations between multiple taxi companies or the like to provide the shared ride for the plurality of passengers from the convention center to the airport.

Also shown in the embodiments of FIG. 8 is an incentive module 868. The incentive module 868 may be configured to receive feedback from passengers regarding drivers providing services and incorporate the received feedback in the characteristic information maintained related to the drivers. Furthermore, the incentive module 868 may provide an incentive reward to a passenger responsive to receiving the feedback from the passenger. For example, a service discount may be provided to a passenger for providing feedback and/or the passenger may be given coupons or the like usable for future services and/or be entered in drawings for prizes or the like. By incorporating the feedback in the subscriber database 209 (driver characteristic information 870), such information may be provided on a real time ongoing basis or otherwise to other passengers and the selection criteria for respective passengers may include criteria based on ratings received from previous passengers utilizing the services of a driver. For example, a five star rating based system could be provided based on summarized information from passenger feedback, which rating system could be supplemented by a comments field or the like including a description of the basis for the rating, which comments could also be presented to a requesting passenger before a selection is made of a candidate driver.

The data portion 456 of the memory 336, as shown in the embodiments of FIG. 8, may include various types of data, such as driver characteristic information 870, passenger selection criteria 872, contact information 874, incentive data 876 and pending request data 878. The driver characteristic information 870 and passenger selection criteria 872 may maintain stored records accessible to the ride matching server 205 and the application programs 454 therein of the characteristic information and selection criteria discussed with reference to the application programs 454. The driver characteristic information 870 may include static information not associated with the time of the trip and/or dynamic information associated with the time of the trip. For example, static criteria may include a language spoken by a driver, passenger size of a vehicle driven by a driver, type of vehicle driven by a driver, quality rating of a driver, driving record of a driver, criminal record of a driver and/or a form of payment accepted by a driver.

Dynamic information may include a current location of a driver, traffic conditions associated with the current location of the driver or routes between the current location and a start location of a trip, estimated travel time to such a location and/or data from sensors associated with a vehicle of a driver. For example, in addition to location information, a variety of smart sensors associated with the vehicle may have wireless transmission means or the like allowing updated characteristic information measured from the vehicle to be provided to the ride matching server 205 and stored in the driver characteristic information 870. By way of example, some vehicles are provided with tire pressure sensors and such sensors could provide notification of the status of the tire air pressure or other maintenance details about a vehicle that may be pertinent to comfort, safety, or the like and affect a passenger's choice of driver for a trip.

The passenger selection criteria 872 may provide limits or preference values for a passenger and/or a trip by a passenger that may be used in evaluating desirability of the driver based on the driver characteristic information 870. As with the driver characteristic information 870, the passenger selection criteria 872 may also be associated with dynamic criteria or static criteria. For example, a dynamic criteria corresponding to dynamic characteristic information mentioned above may include a proximity of a current location of a driver to a trip start location associated with the passenger, acceptable limits associated with current data from sensors associated with a vehicle of the driver and/or an expected wait time before a driver would be expected to arrive at a trip start location associated with a passenger.

The contact information 874 may include contact information for passengers and/or drivers associated with the ride matching service supported by the ride matching server 205. Such contact information may be utilized to allow a receiving passenger and/or identified candidate driver to match the passenger and driver so that a trip may be finalized and arranged. As discussed with respect to different embodiments above, provision of such contact information may include establishing a communication connection to allow a connection between a passenger and a driver. In some embodiments, the contact information 874 may include identification information for use in visual identification of the associated passenger and/or driver. Such visual identification information may be provided to allow a driver and a passenger to more readily locate each other in a public location, such as a convention center or the like. In various embodiments, the contact information 874 about a passenger may be provided to a driver and/or vise versa.

Also shown in the embodiments of FIG. 8 is the incentive data 876. The incentive data 876 may be used by the incentive module 868 to determine an appropriate award to provide a passenger for providing feedback. Similarly, the incentive data 876 may maintain a record of awards previously provided to a passenger and may further access such data for use in determining provision of a benefit to a passenger. For example, if discount points are accumulated for feedback, which points may be used on a future trip, the driver identification module 860, bartering module 864, ride sharing module 866 and/or incentive module 868 may use such information to adjust a price offered to a passenger for provision of a driver for a trip. Feedback from passengers may be maintained as part of the incentive data 876 and/or incorporated in the driver characteristic information 870 in a summary form or otherwise.

The pending request data 878, in some embodiments, may include information about currently pending requests that may be used by the ride sharing module 866 as discussed previously. The currently pending requests in the pending request data 878 may be for a request for an immediate provision of a driver or may be associated with a reservation request for a planned trip at a scheduled time in the future. For such reservation requests, the pending request data 878 may include an associated date and/or time defining the scheduled time in the future when the reservation request requires a driver. The designation of a candidate driver for such a reservation request may occur at the time of receipt of the reservation request and/or at or about the scheduled time in the future associated with the time of the trip.

Figure 9:
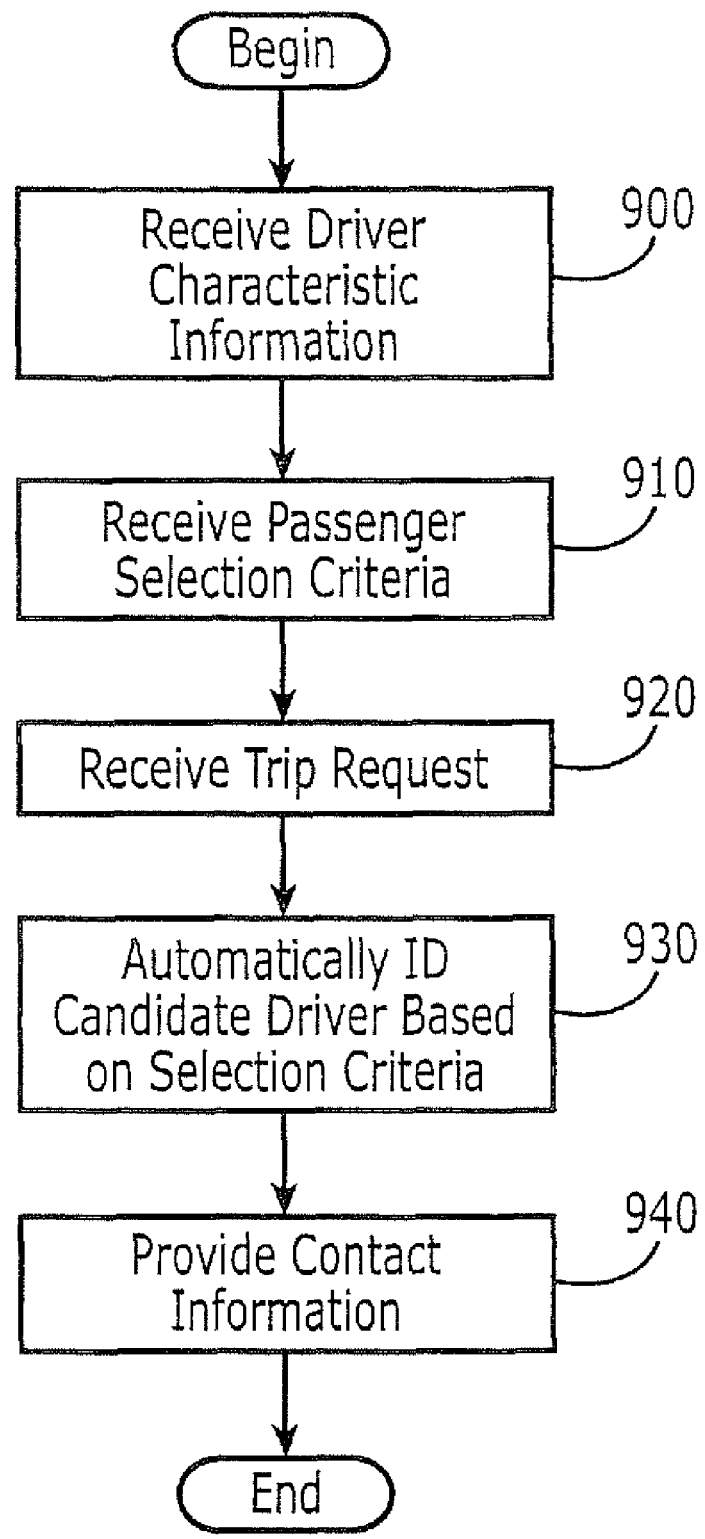
FIG. 9 is a flow chart illustrating operations for ride matching according to further embodiments of the present invention.

Referring now to the flowchart diagram of FIG. 9, operations for matching a passenger with a driver for a trip to a destination begin at Block 900 by receiving characteristic information about a plurality of drivers. The driver characteristic may include characteristic information about a transportation service providing company. In other words, a driver as used herein may refer to an individual and/or to a transportation service providing company such as a taxi cab company, a limousine service or the like. A plurality of selection criteria are received (directly or indirectly) from the passenger (Block 910). Such selection criteria may be received with or as part of a request for a trip, in connection with a registration of the passenger with a ride sharing service supported by the ride matching server 205 and/or by accessing other databases or the like containing information associated with a passenger selection criteria that are available to the ride matching server 205 and/or receiving such information through a third party.

The selection criteria received at Block 910 may include static criteria not associated with the time of the trip and/or dynamic criteria associated with the time of the trip. For example, the static criteria may include a language spoken by the driver, a passenger size of the vehicle driven by a driver, a type of vehicle driven by a driver, quality rating of a driver, a driving record of a driver, a criminal record of a driver and/or form of payment accepted by a driver. For example, a passenger may request a minimum passenger size of a vehicle of five passengers for a trip, an English speaking driver and a German luxury car as a type of vehicle driven by a driver and a pressure of about 32 psi in the tires of the vehicle. Similarly, feedback based on an otherwise available quality rating database may be accessed.

Static criteria may include a minimum qualification or quality rating of a driver. A passenger may also include a static criteria that only drivers accepting a credit card as a form of payment are desired. A driving record of a driver and/or criminal record of a driver may be specified where a screening criteria applied globally by the ride matching service provider is more lenient than a standard desired by an individual passenger. For example, the ride sharing service may require nothing more relative to a driving record than that the driver have a currently valid license that has not been suspended for driving while intoxicated or the like. In contrast, an individual passenger may desire a limitation so as only to be offered candidate drivers who have not had an accident or citation for a moving violation within the prior three year period. The static criteria may, thus, correspond to determinations of accept or reject for a driver based on static characteristic information associated with the driver, which may be maintained in the driver characteristic information 870.

The dynamic criteria may include a proximity of a current location of a driver to a trip start location associated with a passenger, traffic conditions associated with a route from a current location of a driver and a trip start location associated with a passenger, acceptable limits associated with current data from sensors associated with a vehicle of a driver and/or an expected wait time before a driver would be expected to arrive at a trip start location associated with a passenger. Such dynamic characteristic information may be updated on an interval basis automatically by the ride matching server 205 and/or may be updated by communicating a request for an update to a driver/vehicle at the time of receipt of a request for a trip or a scheduled time associated with a reservation request for a planned trip.

Note that some criteria may be static in some cases and dynamic in others. For example, a driver may be associated with a plurality of different types of cars, in which case the type of car associated with a driver may be a dynamic criteria.

A request for the trip is received (directly or indirectly) from the passenger (Block 920). Such a request may be received at the time the driver is desired for an immediate trip or may be a reservation request for a planned trip at a scheduled time in the future. One of the drivers is automatically identified as a candidate driver for the trip based on the selection criteria and the characteristic information responsive to the received request (Block 930). Contact information is provided to the passenger and/or the identified candidate driver to match the passenger with the identified candidate driver (Block 940). Such contact information may include providing one or both of the passenger and/or identified candidate driver visual identification information.

Further embodiments of computer-implemented methods for matching a passenger with a driver for a trip to a destination will now be described with reference to the flowchart illustration of FIG. 10. It will be understood that a variety of features, such as trip planning, bartering, passenger grouping for ride sharing, arrival notification, feedback and incentive provisions will be discussed with reference to various blocks of the flowchart of FIG. 10 but that different ones of these features may be included or not included in various combinations in different embodiments and still be within the scope of the present invention as the present invention is not limited to the particular combinations of operations described with reference to FIG. 10.

Figure 10:
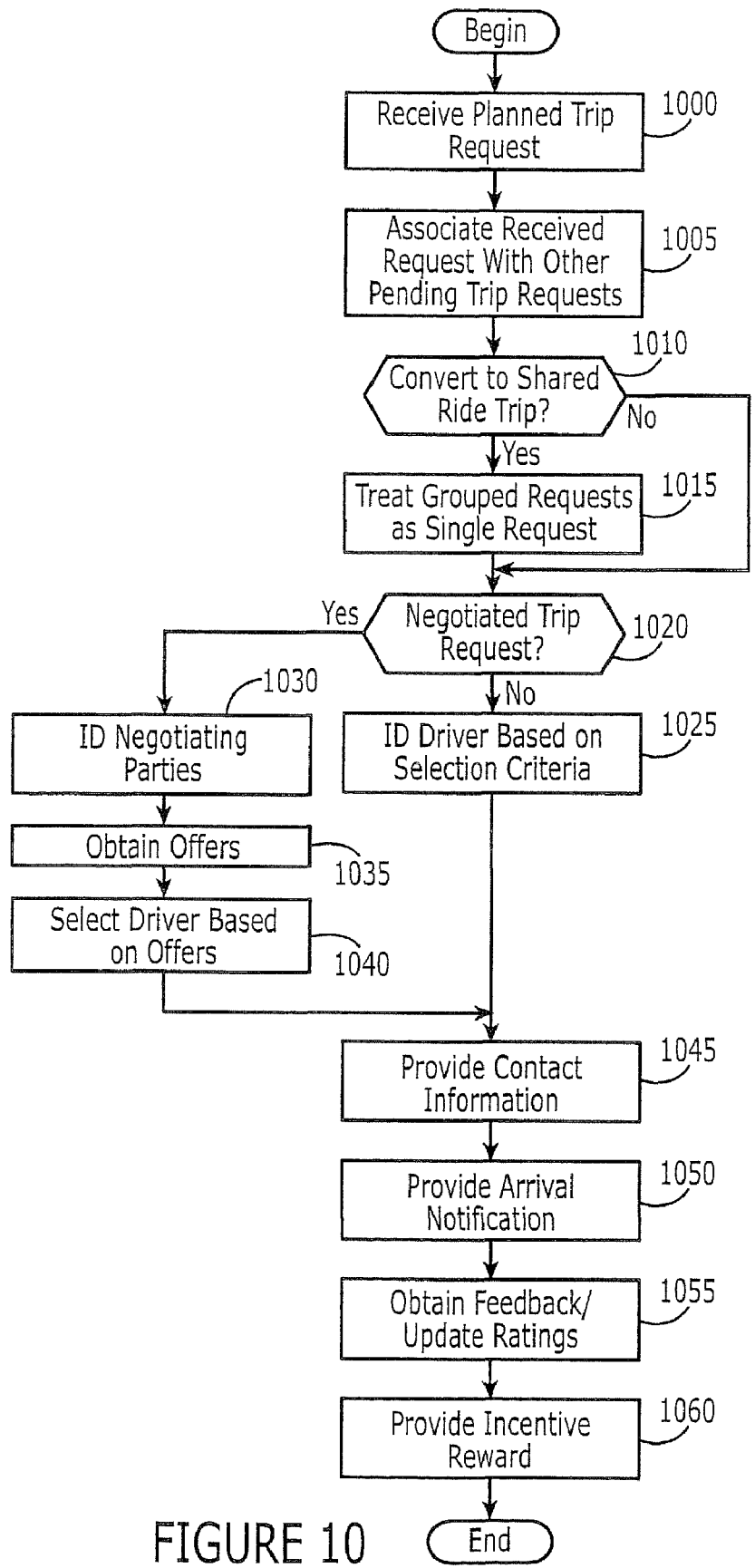
FIG. 10 is a flow chart illustrating operations for ride matching according to yet further embodiments of the present invention.

As shown for the embodiments of FIG. 10, a reservation request for a planned trip at a scheduled time in the future is received (Block 1000). The received reservation request may include a date and/or time defining the scheduled time in the future at which the planned trip will occur.

Ride sharing operations according to some embodiments of the present invention will now be described with reference to Blocks 1005 through 1015. For embodiments including ride sharing, a plurality of currently pending requests for trips are associated with a received request as a candidate shared ride trip having a plurality of associated passengers. For example, a request received at Block 1000, for a planned future trip or for a currently scheduled trip, may be received from a passenger at a convention center wishing to travel to an airport at the end of a convention session. A number of other requests for transit between the same convention center and the airport may have been previously received and stored as pending request data 878. If it is determined that the associated requests should be converted to a shared ride trip that merges the respective requests for trips to a single request (Block 1010), the grouped requests are treated as a single request (Block 1015). The determination at Block 1010 may include determining if the passengers associated with the candidate shared ride trip consent to conversion of their respective requests for trips to a request for a shared ride trip that merges their respective requests. Such a determination may be provided, for example, by contacting the respective passengers using contact information maintained in the contact information 874 and/or based upon passenger selection criteria 872 associated with the respective passengers that may designate a predetermined consent or lack of consent to shared rides.

Operations at Block 1005 for associating a plurality of currently pending requests for trips as a candidate shared ride trip may include determining start locations associated with the currently pending requests and associating ones of the requests having start locations that satisfy a proximity criterion. In some embodiments, operations for associating a plurality of the currently pending requests at Block 1005, include determining start locations and destinations associated with the currently pending requests and associating the currently pending requests as a candidate shared ride trip where they have destinations that satisfy a routing criterion and have start locations that satisfy the proximity criterion. If no currently pending requests meet the association determination criteria at Block 1005 or it is otherwise determined that the associated requests are not to be converted to a shared ride trip at Block 1010, operations at Block 1015 are bypassed.

As shown at Block 1020, it is determined if an individual request for a trip received at Block 1000 or shared a ride request generated at Block 1015 is a negotiated trip request (Block 1020). If not, a candidate driver is identified based on selection criteria and characteristic information (Block 1025). Operations at Block 1025 may proceed substantially as discussed previously with reference to Block 930 of FIG. 9.

In some embodiments of the present invention, if a negotiated trip request is received (Block 1020), operations for bartering between candidate drivers may proceed as will now be described with reference to Blocks 1030 through 1040. As with the determination of whether a request should be converted to a shared ride trip described above with reference to Block 1010, the determination at Block 1020 may be based upon a query to a passenger at time of receipt of a request for a planned trip and/or based upon selection criteria or the like associated with a passenger that predetermine whether a negotiated trip should be arranged for that passenger. In some embodiments, all passengers may be provided such a negotiated trip as a default with or without advising a passenger that such a negotiation occurs as the negotiation itself may occur solely between candidate drivers with the passenger only receiving notification of the selected driver from those negotiations, All of the negotiating drivers may otherwise meet the selection criteria identified by the passenger before being included in the negotiation or bartering operations.

For the embodiments illustrated in FIG. 10, a plurality of drivers are identified as negotiating parties for a trip (Block 1030). For example, as noted above, only a limited subset of available drivers may meet selection criteria specified by the passenger for the trip and drivers meeting those criteria may be selected through identification at Block 1030 as negotiating parties. Offers are obtained from negotiating parties for the trip (Block 1035). One of the negotiating parties is selected as the candidate driver based on the obtained offers (Block 1040). In some embodiments where a shared ride trip is being negotiated at Blocks 1035 and 1040, variable pay rates may be provided for the obtained offers. For example, a passenger may want the ride and, during the ride, the driver stops to pick up a second passenger, but the respective passengers associated legs of the trip are significantly different in distance or some other property, the respective passengers may pay different rates, which may be dynamically negotiated. For example if yours is 10× the distance of mine, or largely different by some other variable, then maybe you pay twice as much, or ten times as much.

In some embodiments of the present invention, operations at Block 1035 and 1040 include establishing a bartering communication connection between the negotiating parties. The passenger may also be included, either as a participant or an observer, in such an established bartering communication connection. In some embodiments, operations at Block 1040 include providing the obtained offers from Block 1035 to the passenger and receiving a designation of one of the negotiating parties as the candidate driver from the passenger responsive to providing the obtained offers to the passenger. For example, the negotiating criteria for determining a "best" choice for driver in light of potentially subjective criteria of a passenger may be most reliably resolved by presenting the different offer parameters to the passenger for selection at the time of offering of the service. In the context of the exemplary taxi ride from a convention center to a destination airport discussed above, one taxi company may offer a thirty dollar price for the trip but promise the use of a Mercedes automobile including various luxury features for the ride. In contrast, the offer from a second taxi company may be for a lower price of twenty dollars, but an older, much lower quality/comfort vehicle may be offered for the ride. A passenger may then make a value judgment after receipt of the obtained offers as to whether the price differential should be the determinative factor in selection of a driver or the quality of the vehicle would outweigh the price differential between the offers.

In some embodiments, the selection at Block 1040 may be based on a comparison of the obtained offer to one or more selection criteria associated with the passenger. Thus, for example, one passenger may specify a preference to always receive the lowest cost provider while another may specify a dollar and/or percentage price differential where a higher quality vehicle would be preferred over a lower priced but lower quality vehicle. Such predesignation of criteria may then be maintained in the passenger selection criteria 872.

Contact information is provided to the passenger and/or the identified candidate driver to match the passenger with the identified candidate driver (Block 1045). The passenger may be notified when the identified candidate driver arrives at a start location associated with the trip (Block 1050). Thus, for example, identification information for use in visual identification of the driver may be provided to the passenger at Block 1045 and then the passenger may be notified at Block 1050 of arrival of the driver at the convention center or the like so that the passenger may start looking for the driver using the visual identification information provided at Block 1045. The contact information provided at 1045 may also include a name or the like for the driver to facilitate the initial contact between the passenger and the identified candidate driver. However, it will be understood that, in some embodiments, the contact information at Block 1045 is provided to the candidate driver and the arrival notification may be provided to a passenger at 1050 to increase the likelihood that the passenger will be present at an expected location at the time of arrival of the driver so that the driver may more readily locate the passenger in a crowd or the like without excessive delays.

As further shown in the embodiments of FIG. 10, feedback may be received from the passenger regarding the identified driver (Block 1055). The received feedback may be incorporated in the characteristic information 870 associated with the drivers at Block 1055. For example, such feedback may be used to update a driver quality star rating associated with a driver and/or to provide passenger commentary supporting the provided rating on the driver, which rating and explanatory supporting information may be readily accessed by future passengers in making a determination and selection of a candidate driver for a trip.

As shown for the embodiments of FIG. 10, in some embodiments, an incentive reward may be provided to the passenger responsive to receiving the feedback from the passenger (Block 1060). For example, discounts on services, coupons and/or entries in prize drawings or the like may be provided as an incentive reward to a passenger at Block 1060.

The flowcharts, flow diagrams and block diagrams of FIGS. 2 through 10 illustrate the architecture, functionality, and operation of possible implementations of systems, methods and computer program products for ride matching according to embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A computer-implemented system for matching a passenger with a driver for a trip to a destination, comprising:
   characteristic information about a plurality of drivers stored in a computer-readable memory device;
   a ride matching server computer, coupled to the computer-readable memory device, that includes a driver identification module executable on a processor of the ride matching server computer that is configured to identify one of the plurality of drivers as a candidate driver for the trip based on selection criteria associated with the passenger and the characteristic information responsive to a received request for a trip; and
   a communication interface coupled to the ride matching server computer that is configured to receive a request for a driver for a trip from the passenger and to provide contact information to the passenger and the candidate driver identified to match the passenger with the candidate driver identified.

2. The system of claim 1, wherein the ride matching server computer further comprises a bartering module, executable on the processor of the ride matching server computer, that is configured to identify a plurality of the plurality of drivers as negotiating parties for the trip, obtain offers from the negotiating parties for the trip and select one of the negotiating parties as the candidate driver based on the offers.

3. The system of claim 2, wherein the ride matching server computer further comprises a ride sharing module, executable on the processor of the ride matching server computer, that is configured to associate a plurality of currently pending requests for trips as a candidate shared ride trip having a plurality of associated passengers and to determine if the plurality of associated passengers associated with the candidate shared ride trip consent to conversion of their respective requests for trips to a request for a shared ride trip that merges their respective requests for trips to a single request.

4. The system of claim 3, wherein the ride matching server computer further comprises an incentive module, executable on the processor of the ride matching server computer, that is configured to receive feedback from passengers regarding drivers providing services and incorporate the feedback received in the characteristic information maintained related to the drivers and to provide an incentive reward to a passenger responsive to receiving the feedback from the passenger.

5. The system of claim 1, wherein the ride matching server computer further comprises an incentive module, executable on the processor of the ride matching server computer, that is configured to receive feedback from passengers regarding drivers providing services and incorporate the feedback received in the characteristic information maintained related to the drivers and to provide incentive rewards to passengers responsive to receiving the feedback from the passengers.

6. The system of claim 5, wherein the incentive rewards comprise at least one reward selected from a group consisting of a service discount usable for future ride matching services, a coupon usable for future ride matching services and an entry in a drawing for prizes.

7. The system of claim 6, the incentive module is further configured to incorporate the feedback from the passengers in the characteristic information about the plurality of drivers and wherein the driver identification module is configured to provide the feedback from the passengers to other passengers as the feedback is received and wherein the selection criteria for respective ones of the passengers includes criteria based on ratings received from other passengers utilizing the services of a driver.

8. The system of claim 7, wherein the driver identification module is further configured to update respective numeric value ratings for the drivers providing services based on the feedback from the passengers and to provide the updated numeric value to the other passengers, wherein the numeric value ratings comprise a range of values defined by a rating based system.

9. The system of claim 8, wherein the rating based system comprises a star rating based system.

10. The system of claim 8, wherein the driver identification module is further configured to supplement the numeric value ratings provided to the other passengers with a comments field including a description of the basis for the numeric value ratings and to provide the numeric value ratings and comments to a requesting one of the passengers responsive to a received request for a trip before receiving a selection of the candidate driver for the trip from the requesting one of the passengers.

11. The system of claim 1, wherein the communication interface is configured to communicate with the passenger and/or the identified candidate driver over one of more of a public switched telephone network, an internet protocol network and a wireless network.

12. The system of claim 1, wherein the ride matching server computer further comprises a ride sharing module, executable on the processor of the ride matching server computer, that is configured to associate a plurality of currently pending requests for trips as a candidate shared ride trip having a plurality of associated passengers and to determine if the passengers associated with the candidate shared ride trip consent to conversion of their respective requests for trips to request for a shared ride trip that merges their respective requests for trips to a single request.

13. The system of claim 12, wherein the driver identification module is further configured to identifying one the drivers as a candidate driver for the shared ride trip only when a plurality of the passengers associated with the candidate shared ride trip consent.

14. The system of claim 2, wherein the communication interface is configured to establish a bartering communication connection between the negotiating parties.

* * * * *